US010638908B2

(12) United States Patent
Goto et al.

(10) Patent No.: US 10,638,908 B2
(45) Date of Patent: May 5, 2020

(54) METHOD AND SYSTEM FOR MANUFACTURING CLEANING MEMBER

(71) Applicant: UNICHARM CORPORATION, Shikokuchuo-shi, Ehime (JP)

(72) Inventors: Hiroaki Goto, Kanonji (JP); Takayuki Matsumoto, Kanonji (JP); Shigetomo Takahashi, Kanonji (JP); Yuji Yamashita, Kanonji (JP)

(73) Assignee: UNICHARM CORPORATION, Ehime (JP)

( * ) Notice: Subject to any disclaimer, the term of this patent is extended or adjusted under 35 U.S.C. 154(b) by 1121 days.

(21) Appl. No.: 14/758,175

(22) PCT Filed: Dec. 27, 2013

(86) PCT No.: PCT/JP2013/085172
§ 371 (c)(1),
(2) Date: Jun. 26, 2015

(87) PCT Pub. No.: WO2014/104322
PCT Pub. Date: Jul. 3, 2014

(65) Prior Publication Data
US 2015/0351602 A1   Dec. 10, 2015

(30) Foreign Application Priority Data

Dec. 29, 2012  (JP) .................................. 2012-289188

(51) Int. Cl.
| A47L 13/16 | (2006.01) |
| A47L 13/38 | (2006.01) |
| B32B 37/04 | (2006.01) |

(52) U.S. Cl.
CPC ............... *A47L 13/16* (2013.01); *A47L 13/38* (2013.01); *B32B 37/04* (2013.01)

(58) Field of Classification Search
USPC .................................................. 156/157, 158
See application file for complete search history.

(56) References Cited

U.S. PATENT DOCUMENTS

| 345,644 A | 7/1886 | Moseman |
| 470,898 A | 3/1892 | Reiffel |
| (Continued) | | |

FOREIGN PATENT DOCUMENTS

| EP | 0546580 | 6/1993 |
| EP | 2009152 | 12/2008 |
| (Continued) | | |

OTHER PUBLICATIONS

International Search Report and Written Opinion dated Feb. 18, 2014, corresponds to International Application No. PCT/JP2013/085203.

(Continued)

*Primary Examiner* — Michelle Lopez
*Assistant Examiner* — Chinyere J Rushing-Tucker
(74) *Attorney, Agent, or Firm* — Hauptman Ham, LLP (57) ABSTRACT

The present invention is a method for manufacturing cleaning members obtained by cutting multi-layer webs formed by: spreading fiber bundles, the lengthwise directions of which are parallel to the direction in which said are conveyed; and layering together at least the spread and nonwoven fabric strips. Said method includes a step in which, before spreading, two or more are joined together, forming one or more join sections. Said joins are performed by joining the back end (with respect to the conveyance direction) of one to the front end (with respect to the conveyance direction) of the next fiber bundle.

12 Claims, 5 Drawing Sheets

(56) References Cited

U.S. PATENT DOCUMENTS

| | | | |
|---|---|---|---|
| 1,847,065 A | 2/1932 | Munch | |
| 1,989,048 A | 1/1935 | Winter et al. | |
| 2,733,064 A | 1/1956 | Martin | |
| 2,737,688 A | 3/1956 | Jackson | |
| 2,738,973 A | 3/1956 | Koch | |
| 2,748,426 A | 6/1956 | Wyatt | |
| 2,828,752 A | 4/1958 | Jackson | |
| 2,836,418 A | 5/1958 | Blattner et al. | |
| 2,904,335 A | 9/1959 | Rabinow | |
| 2,926,392 A * | 3/1960 | Jackson | A24D 3/0204 |
| | | | 19/65 T |
| 2,960,023 A | 11/1960 | Greiner et al. | |
| 3,017,309 A | 1/1962 | Crawford | |
| 3,022,999 A | 2/1962 | Mead | |
| 3,095,343 A | 6/1963 | Berger | |
| 3,120,692 A | 2/1964 | Crawford et al. | |
| 3,218,675 A | 11/1965 | Hendrix | |
| 3,362,707 A | 1/1968 | Laurén | |
| 3,370,848 A | 2/1968 | Bartlett | |
| 3,376,609 A | 4/1968 | Kalwaites | |
| 3,417,560 A | 12/1968 | Watson | |
| 3,468,096 A | 9/1969 | Franz | |
| 3,469,285 A | 9/1969 | Garrison et al. | |
| 3,566,451 A | 3/1971 | Weigand | |
| 3,592,371 A | 7/1971 | Wyatt et al. | |
| 3,608,024 A | 9/1971 | Yazawa et al. | |
| 3,724,037 A | 4/1973 | Nicholson et al. | |
| 3,737,950 A | 6/1973 | Bolliand et al. | |
| 3,827,113 A | 8/1974 | Vidal et al. | |
| 3,840,941 A | 10/1974 | Neveu | |
| 3,860,127 A | 1/1975 | Fassman | |
| 3,907,128 A | 9/1975 | Cathers | |
| 3,912,258 A | 10/1975 | Martin | |
| 3,996,196 A | 6/1976 | Simeth | |
| 4,048,277 A * | 9/1977 | Breznak | B65H 69/00 |
| | | | 112/406 |
| 4,075,375 A | 2/1978 | Komatsu | |
| 4,190,241 A | 2/1980 | Krueger | |
| 4,319,744 A | 3/1982 | Nagel et al. | |
| 4,385,757 A | 5/1983 | Muller | |
| 4,514,128 A | 4/1985 | Hedrick | |
| 4,640,161 A | 2/1987 | Kurk | |
| 4,664,368 A | 5/1987 | Bouwens et al. | |
| 4,817,483 A | 4/1989 | Armbruster | |
| 4,961,805 A | 10/1990 | Siebert | |
| 5,060,351 A | 10/1991 | Street | |
| 5,060,929 A | 10/1991 | Kohlmann | |
| 5,168,786 A | 12/1992 | Huggins et al. | |
| 5,230,764 A | 7/1993 | Moll | |
| 5,241,731 A | 9/1993 | Stuart | |
| 5,243,890 A | 9/1993 | Ober | |
| 5,253,762 A | 10/1993 | Duncan | |
| 5,332,210 A | 7/1994 | Silverberg et al. | |
| 5,355,567 A | 10/1994 | Holliday | |
| 5,417,912 A | 5/1995 | Merry | |
| 5,431,530 A | 7/1995 | Kobayashi et al. | |
| 5,435,541 A | 7/1995 | Fornay et al. | |
| 5,516,091 A | 5/1996 | Nakayama | |
| 5,535,576 A | 7/1996 | Walintschek | |
| 5,779,432 A | 7/1998 | Pena | |
| 6,286,403 B1 | 9/2001 | Rosenthal et al. | |
| 6,491,492 B1 | 12/2002 | Cook | |
| 6,494,450 B2 | 12/2002 | Tsurumaki | |
| 6,554,937 B1 * | 4/2003 | Kenmochi | A47L 13/20 |
| | | | 156/178 |
| 6,572,101 B2 | 6/2003 | Kaya et al. | |
| 6,585,842 B1 | 7/2003 | Bompard et al. | |
| 6,743,392 B2 | 6/2004 | Tanaka et al. | |
| 6,780,264 B2 | 8/2004 | Nakata et al. | |
| 7,003,856 B2 | 2/2006 | Hayashi et al. | |
| 7,156,011 B2 | 1/2007 | Morris et al. | |
| 7,228,587 B2 | 6/2007 | Tanaka et al. | |
| 7,300,053 B2 | 11/2007 | Asano | |
| 7,339,675 B2 | 3/2008 | Nishida et al. | |
| 7,536,761 B2 | 5/2009 | Nestler et al. | |
| 7,571,524 B2 | 8/2009 | Kawabe et al. | |
| 8,100,038 B2 | 1/2012 | Sandahl | |
| 8,201,429 B1 | 6/2012 | Matsunaga | |
| 8,357,415 B2 | 1/2013 | Furusawa | |
| 8,448,335 B2 | 5/2013 | Lundgren et al. | |
| 2002/0026699 A1 * | 3/2002 | Hayashi | D02J 1/18 |
| | | | 28/282 |
| 2002/0148061 A1 | 10/2002 | Tanaka et al. | |
| 2003/0000934 A1 | 1/2003 | Tanaka et al. | |
| 2003/0127177 A1 * | 7/2003 | Lane | B29C 65/5057 |
| | | | 156/157 |
| 2003/0172506 A1 | 9/2003 | Guirman et al. | |
| 2004/0149095 A1 | 8/2004 | Miyatake et al. | |
| 2004/0182498 A1 * | 9/2004 | Beitz | A61F 13/15617 |
| | | | 156/157 |
| 2005/0005381 A1 | 1/2005 | Tanaka et al. | |
| 2005/0039285 A1 | 2/2005 | Tanaka et al. | |
| 2005/0066496 A1 | 3/2005 | Ames et al. | |
| 2005/0097695 A1 | 5/2005 | Tanaka et al. | |
| 2005/0097696 A1 | 5/2005 | Tanaka et al. | |
| 2005/0102979 A1 * | 5/2005 | Uezono | G03B 42/02 |
| | | | 53/513 |
| 2005/0132521 A1 | 6/2005 | Tanaka et al. | |
| 2005/0139513 A1 | 6/2005 | Miller | |
| 2005/0177967 A1 | 8/2005 | Tanaka et al. | |
| 2005/0188490 A1 | 9/2005 | Tanaka et al. | |
| 2005/0193514 A1 | 9/2005 | Tanaka et al. | |
| 2005/0198760 A1 | 9/2005 | Tanaka et al. | |
| 2005/0258589 A1 | 11/2005 | Michler et al. | |
| 2006/0005675 A1 | 1/2006 | Scheffer et al. | |
| 2006/0016035 A1 | 1/2006 | Tanaka et al. | |
| 2006/0016036 A1 | 1/2006 | Tanaka et al. | |
| 2006/0048325 A1 | 3/2006 | Tsuchiya | |
| 2006/0051434 A1 | 3/2006 | Tsuchiya | |
| 2006/0101601 A1 | 5/2006 | Fujiwara et al. | |
| 2006/0156876 A1 | 7/2006 | Sussmeier et al. | |
| 2006/0179989 A1 | 8/2006 | James et al. | |
| 2007/0068353 A1 | 3/2007 | Piucci et al. | |
| 2007/0101564 A1 | 5/2007 | Nestler et al. | |
| 2008/0047087 A1 | 2/2008 | Levy et al. | |
| 2009/0049633 A1 | 2/2009 | Takabayashi et al. | |
| 2009/0165230 A1 | 7/2009 | Tsuchiya et al. | |
| 2009/0169830 A1 * | 7/2009 | Yamada | A47L 13/12 |
| | | | 428/189 |
| 2009/0172904 A1 | 7/2009 | Tsuchiya et al. | |
| 2009/0196538 A1 | 8/2009 | Liou et al. | |
| 2009/0255078 A1 | 10/2009 | Wada et al. | |
| 2010/0000382 A1 | 1/2010 | Maddalon | |
| 2010/0015383 A1 | 1/2010 | Yamada | |
| 2010/0022978 A1 | 1/2010 | Kasai et al. | |
| 2010/0058907 A1 | 3/2010 | Kern | |
| 2010/0122613 A1 | 5/2010 | Sandahl | |
| 2010/0154156 A1 | 6/2010 | Takabayashi et al. | |
| 2010/0180745 A1 | 7/2010 | Hall | |
| 2011/0088189 A1 | 4/2011 | Wada et al. | |
| 2011/0138942 A1 | 6/2011 | Murata | |
| 2011/0296965 A1 | 12/2011 | Manek-Honninger et al. | |
| 2012/0102678 A1 | 5/2012 | Junker et al. | |
| 2012/0132046 A1 | 5/2012 | Supe-Dienes | |
| 2012/0135227 A1 | 5/2012 | Kawabe | |
| 2012/0167736 A1 | 7/2012 | Yokoe | |
| 2013/0305891 A1 | 11/2013 | Nobukuni | |
| 2014/0182429 A1 | 7/2014 | Saito et al. | |
| 2014/0187406 A1 | 7/2014 | Matsumoto et al. | |

FOREIGN PATENT DOCUMENTS

| | | |
|---|---|---|
| JP | 45-35382 | 11/1970 |
| JP | 48-89917 | 10/1973 |
| JP | 56-169873 | 12/1981 |
| JP | 61-105364 U | 7/1986 |
| JP | 61-105364 U | 7/1986 |
| JP | 3-33222 | 2/1991 |
| JP | 4-289100 A | 10/1992 |
| JP | 5-20896 U | 3/1993 |
| JP | 5-279950 | 10/1993 |
| JP | 5-316909 | 12/1993 |
| JP | 6-297386 A | 10/1994 |

(56) References Cited

FOREIGN PATENT DOCUMENTS

| | | |
|---|---|---|
| JP | 8-49126 | 2/1996 |
| JP | 9-111644 | 4/1997 |
| JP | 9-111644 A | 4/1997 |
| JP | 10-110346 | 4/1998 |
| JP | 10-266012 A | 10/1998 |
| JP | 11-323718 | 11/1999 |
| JP | 2000-296083 | 10/2000 |
| JP | 2001-246595 | 9/2001 |
| JP | 2001-288639 | 10/2001 |
| JP | 2002-66991 A | 3/2002 |
| JP | 2002-069781 | 3/2002 |
| JP | 2003-265390 | 9/2003 |
| JP | 2003-268663 | 9/2003 |
| JP | 2003-293236 | 10/2003 |
| JP | 2004-223692 | 8/2004 |
| JP | 2004-238615 | 8/2004 |
| JP | 2004-238615 A | 8/2004 |
| JP | 2005-040641 | 2/2005 |
| JP | 2005-046645 | 2/2005 |
| JP | 2005-111284 | 4/2005 |
| JP | 2005-137929 | 6/2005 |
| JP | 2005-137930 | 6/2005 |
| JP | 2005-137931 | 6/2005 |
| JP | 2005-144198 | 6/2005 |
| JP | 2005-169148 | 6/2005 |
| JP | 2005-237975 | 9/2005 |
| JP | 2006-015164 | 1/2006 |
| JP | 2006-034990 | 2/2006 |
| JP | 2006-141483 | 6/2006 |
| JP | 2006-152485 | 6/2006 |
| JP | 2006-166931 | 6/2006 |
| JP | 2006-265762 | 10/2006 |
| JP | 2007-002390 | 1/2007 |
| JP | 2007-029135 | 2/2007 |
| JP | 2007-111297 | 5/2007 |
| JP | 2007-126810 | 5/2007 |
| JP | 2007-135666 | 6/2007 |
| JP | 2007-135774 | 6/2007 |
| JP | 2007-136156 | 6/2007 |
| JP | 2007-159612 | 6/2007 |
| JP | 2007-209460 | 8/2007 |
| JP | 2007-283086 | 11/2007 |
| JP | 2008-6260 | 1/2008 |
| JP | 2008-119171 | 5/2008 |
| JP | 2008-125603 | 6/2008 |
| JP | 2008-125603 A | 6/2008 |
| JP | 2009-153914 | 7/2009 |
| JP | 2009-254536 A | 11/2009 |
| JP | 2010-24575 | 2/2010 |
| JP | 2011-062802 | 3/2011 |
| JP | 2011-084313 | 4/2011 |
| JP | 2011-84313 A | 4/2011 |
| JP | 2011-94701 A | 5/2011 |
| JP | 4738311 | 8/2011 |
| JP | 2012-115783 | 6/2012 |
| JP | 2013-240861 A | 12/2013 |
| KR | 20110137660 | 12/2011 |
| WO | 2007/023965 | 3/2007 |
| WO | 2008/099733 A1 | 8/2008 |

OTHER PUBLICATIONS

International Search Report and Written Opinion dated Mar. 25, 2014, corresponds to International Application No. PCT/JP2013/085170.
International Search Report and Written Opinion dated Feb. 18, 2014, corresponds to Internation Application No. PCT/JP2013/085179.
Office Action dated Apr. 29, 2015, corresponding to U.S. Appl. No. 13/749,717.
Office Action dated Apr. 27, 2015, corresponding to U.S. Appl. No. 13/749,726.
International Search Report dated Mar. 25, 2014, corresponds to International Application No. PCT/JP2013/085172.
International Search Report dated Mar. 18, 2014, corresponds to International Application No. PCT/JP2013/085177.
International Search Report dated Apr. 1, 2014, corresponds to International Application No. PCT/JP2013/085233.

* cited by examiner

METHOD AND SYSTEM FOR MANUFACTURING CLEANING MEMBER

RELATED APPLICATIONS

The present application is a National Phase of International Application Number PCT/JP2013/085172, filed Dec. 27, 2013, which claims priority to Japanese Application Number 2012-289188, filed Dec. 29, 2012.

TECHNICAL FIELD

The present invention relates to a method of producing a cleaning member, and a system of producing a cleaning member.

BACKGROUND ART

Various types of cleaning members capable of trapping dust, trash, etc., are conventionally known, and methods for producing the various types have been examined from a variety of viewpoints.

For example, Patent Literature 1 proposes a method of producing a cleaning member comprising the steps of:

stacking a belt-shaped inner fibrous layer consisting of continuous fiber bundles and a belt-shaped sheet member, both being partially joined to form a first continuous body, followed by the formation of a second continuous body in a similar manner, and, after the first and the second continuous bodies are stacked and partially fixed, stacking and fixing a belt-shaped outer fibrous layer consisting of continuous fiber bundles on each of the inner fibrous layer side of the first and the second continuous bodies;

cutting the laminate obtained in the preceding step into a predetermined length; and applying a compressed air to the fibrous layer part of the cut laminate to open the fiber bundles;

wherein the belt-shaped inner fibrous layer and outer fibrous layer are each composed of fiber bundles consisting of curled fibers bent in a zig-zag form, a vertical height between the alternating peaks and troughs of the above curled fiber is 0.1 to 0.7 mm, and, during the step of opening the above fiber bundles, the fiber bundles in the cut laminate are teased so that the entire periphery of the cleaning member is covered with brush tips consisting of the fiber of the fiber bundles.

Also, Patent Literature 2, for example, proposes a method of producing a cleaning member, wherein a first continuous body having a first fibrous layer consisting of continuous fiber bundles and a first belt-shaped member, in which both longitudinal ends of the first belt-shaped member are folded to be stacked and fixed, and the first fibrous layer is stacked on and fixed to the outer face side of the first belt-shaped member, and a second continuous body having a second fibrous layer consisting of continuous fiber bundles and a second belt-shaped member, in which both longitudinal ends of the second belt-shaped member are folded to be stacked and fixed, and the second fibrous layer is stacked and fixed onto the outer face side of the second belt-shaped member, are produced, and after the first continuous body and the second continuous body thus produced are stacked and joined to each other, a third fibrous layer and a fourth fibrous layer, each consisting of continuous fibrous bundles, are stacked on the first fibrous layer and the second fibrous layer, respectively, and fixed to form a laminate, then the laminate thus formed is cut to obtain individual cleaning members, characterized in that the method comprises the steps of:

intermittently forming broken guide lines spanning the entire lateral area of each of the first belt-shaped member and the second belt-shaped member in the first belt-shaped member and the second belt-shaped member so that a central part sandwiched by a pair of broken guide lines and an external part provided consecutively in the central part via the broken guide lines are formed in each of the first belt-shaped member and the second belt-shaped member, respectively;

joining the first belt-shaped member and the second belt-shaped member, after forming the broken guide lines, to the first fibrous layer and the second fibrous layer with a central continuous seal line spanning the entire lateral area of each of the first fibrous layer and the second fibrous layer to produce the first continuous body and the second continuous body;

stacking the first continuous body and the second continuous body to join them with side noncontinuous seals spanning the entire lateral area of the first fibrous layer and the second fibrous layer;

further stacking and fixing a third fibrous layer and a fourth fibrous layer onto the first fibrous layer of the first continuous body and the second fibrous layer of the second continuous body to form the laminate;

excising the external part flanking the central part, leaving the central part sandwiched by the pair of broken guide lines, from each of the cut first belt-shaped member and the cut second belt-shaped member, after cutting the laminate; and opening the cut first through fourth fibrous layers, so as to tease them randomly in three-dimensional directions, after cutting the laminate.

Furthermore, Patent Literature 3, for example, proposes a method of producing a cleaning member comprising the steps of:

laminating a continuous body comprising a four-layered long fibrous layer in which fiber bundles are oriented in one direction, a continuous body comprising two long scraping sheets, and a continuous body comprising two long base sheet in the order of the continuous body comprising the fibrous layer, the continuous body comprising the scraping sheets, the continuous body comprising the fibrous layer, the continuous body comprising the two base sheets, the continuous body comprising the fibrous layer, the continuous body comprising the scraping sheets, and the continuous body comprising the fibrous layer, joining the continuous bodies with one another at a predetermined distance in the lateral direction to prepare a cleaning member continuous body, and then cutting, in the lateral direction, the cleaning member continuous body at the junctions between the continuous body of the fibrous layer and the continuous body of the base sheet and the continuous body of the scraping sheet to obtain a plurality of the cleaning member.

CITATION LIST

Patent Literature

[PTL 1] Japanese Patent No. 4878988
[PTL 2] Japanese Patent No. 4738311
[PTL 3] Japanese Patent No. 4675218

SUMMARY OF INVENTION

Technical Problem

However, there is currently a need for a novel production method and a production system of producing cleaning members capable of trapping dust, trash, etc., in a more efficient manner. Considering the above circumstance, the present invention was found by the present inventors as a result of intensive and extensive investigation.

Thus, it is an object of the present invention to provide a novel production method and a novel production system that are suitable for producing a cleaning member having excellent cleaning performance and that realize efficient production, in particular, that can continuously produce a cleaning member.

Solution to Problem

In order to achieve the above objective, the present invention provides a method of producing a cleaning member obtained by cutting a multi-layer web formed by opening fiber bundles that are elongated in a conveyance direction and laminating at least the opened fiber bundles and a belt-shaped nonwoven fabric, wherein the method of producing the cleaning member comprises at least a step of connecting at least two of the fiber bundles prior to opening to form a connecting part, the step comprising connecting the terminal end in the conveyance direction of a preceding fiber bundle and the starting end in the conveyance direction of the following fiber bundle to form the connecting part.

In order to achieve the above objective, the present invention further provides a system of producing a cleaning member obtained by cutting a multi-layer web formed by opening fiber bundles that are elongated in a conveyance direction and laminating at least the opened fiber bundles and a belt-shaped nonwoven fabric, wherein the system of producing a cleaning member comprises at least a device for connecting at least two of the fiber bundles prior to opening, the device connecting the terminal end in the conveyance direction of a preceding fiber bundle and the starting end in the conveyance direction of the following fiber bundle to form a connecting part.

Effects of Invention

In accordance with the present invention, a novel production method and a novel production system that are suitable for producing a cleaning member having an excellent cleaning performance, that realize efficient production, and in particular, that can continuously produce a cleaning member by connecting at least two fiber bundles is provided.

DESCRIPTION OF EMBODIMENTS (Method of Producing a Cleaning Member)

The method of producing the cleaning member of the present invention will now be explained in detail below.

The method of producing a cleaning member according to the present invention is a method of producing a cleaning member obtained by cutting a multi-layer web formed by opening fiber bundles that are elongated in a conveyance direction and laminating at least the opened fiber bundles and a belt-shaped nonwoven fabric, the method comprising at least a step of connecting at least two of the fiber bundles prior to opening to form a connecting part, the step comprising connecting the terminal end in the conveyance direction of a preceding fiber bundle and the starting end in the conveyance direction of the following fiber bundle to form the connecting part (an aspect 1).

The method of producing a cleaning member according to the present invention is a novel production method that is suitable for producing a cleaning member having excellent cleaning performance and that can realize efficient production. In particular, in the method of producing a cleaning member according to the present invention, when a preceding fiber bundle is used up, and then the following fiber bundle is fed to the production system, the terminal end in the conveyance direction of the preceding fiber bundle is connected to the starting end in the conveyance direction of the following fiber bundle. This allows continuous feeding of fiber bundles to the production system, and thus allows efficient production of cleaning members without stopping production of the cleaning members. It should be noted that the term "fiber bundles prior to opening" used herein means that the step of opening such fiber bundles is carried out later and does not mean that the fiber bundles to be connected are not opened before the bundles are connected.

It is preferred to further include a step of opening the fiber bundles after the step of forming the connecting part and before laminating the fiber bundles and the belt-shaped nonwoven fabric in the aspect 1 (an aspect 2). According to the aspect 2, since the fiber bundles are opened after connecting the preceding and the following fiber bundles, and thus the connecting part of the fiber bundles is securely connected so that the connecting part is not opened, while the parts other than the connecting part are opened, and thus the width of the parts can be increased to a width that corresponds to the required dimension as the cleaning member.

It is preferred to further include a step of detecting the connecting part by a detecting unit after the step of opening the fiber bundles and before laminating the fiber bundles and the belt-shaped nonwoven fabric in the aspect 2 (an aspect 3). According to the aspect 3, the connecting part of the fiber bundles can be detected by the detecting unit by determining, for example, the width, thickness, hardness, etc., of the connecting part.

More preferably, the detecting unit in the aspect 3 detects the connecting part by detecting that the length in the lateral direction of the fiber bundles is smaller than a predetermined length (an aspect 4). According to the aspect 4, the connecting part of the fiber bundles are securely connected and thus is not opened as described above, and then the width of the fiber bundles in the connecting part are not substantially widened. As a result, the detecting unit that determine the width of the fiber bundles can detect that the connecting part of the fiber bundles, the part not having a width that corresponds to the required dimension as the cleaning member, passes under the detecting unit. The term "predetermined length" used herein refers to a length that is less than a width that corresponds to the required dimension as the cleaning member, that is sufficiently larger than the width of the connecting part of the fiber bundles, the part being not opened and thus being not widened as described above, and that is appropriately selected considering the detection accuracy. Preferably, the detecting unit is disposed before the step of laminating the fiber bundles and a belt-shaped nonwoven fabric to form the multi-layer web as described below. Examples of the detecting unit include, for example, phototubes and cameras. As used herein, the phototubes are a detector in which a light-emitting part and a light-receiving part are integrated, the detector comprising the light-emitting part that emits light rays such as infrared rays to a predetermined lateral position of the fiber bundles and the light-receiving part detecting the reflected light. By such configuration, depending upon whether the light-receiving part detects the reflection of light rays from the light-emitting part, the position of the connecting part of the fiber bundles, the part having a smaller width, is detected. The cameras, as used herein, by binarizing an image taken with the cameras using a predetermined parameter and determining whether the fiber bundles are widened to a predetermined lateral position, is for detecting the position of the connecting part of the fiber bundles, the part having a smaller width.

It is preferred to further include a step of laminating the fiber bundles and a belt-shaped nonwoven fabric to form a multi-layer web and a step of fixing the fiber bundles and the belt-shaped nonwoven fabric contained in the multi-layer web to each other after the step of opening the fiber bundles, in any one of the aspects 2-4 (an aspect 5).

Preferably, the fixing step in the aspect 5 is a step of melt-bonding the fiber bundles and the belt-shaped nonwoven fabric contained in the multi-layer web to each other (an aspect 6). This step allows secure fixing of the fiber bundles and the belt-shaped nonwoven fabric to each other and excels in high-speed production. In another embodiment, the fixing step is a step of adhering, by hot-melt, the fiber bundles and the belt-shaped nonwoven fabric contained in the multi-layer web to each other.

It is preferred to further include a step of cutting the multi-layer web in the lateral direction of the multi-layer web to form individual cleaning members and a step of ejecting any of the cleaning members that include the connecting part of the fiber bundles after the fixing step, in the aspect 5 or 6 (an aspect 7). Since the connecting part of the fiber bundles is securely connected, and thus the fiber bundles are not opened, any of the cleaning members that include the connecting part of the fiber bundles is inferior in quality. According to the aspect 7, such a low-quality cleaning member can be ejected, and thus higher-quality cleaning members can be produced, which is advantageous.

In the method of producing a cleaning member according to the present invention, two or more of the aspects 1-7 can be combined.

[System of Producing a Cleaning Member]

The system of producing a cleaning member according to the present invention will now be explained in detail below.

The system of producing a cleaning member according to the present invention is a system of producing a cleaning member obtained by cutting a multi-layer web formed by opening fiber bundles that are elongated in a conveyance direction and laminating the opened fiber bundles and a belt-shaped nonwoven fabric, and comprises at least a device for connecting at least two fiber bundles, the device connecting the terminal end in the conveyance direction of a preceding fiber bundle and the starting end in the conveyance direction of the following fiber bundle to form a connecting part (an aspect 8).

The system of producing a cleaning member according to the present invention is a novel production system that is suitable for producing a cleaning member having an excellent cleaning performance and that realizes efficient production. In particular, when a preceding fiber bundle is used up, and then the following fiber bundle is fed to the production system, the system of producing a cleaning member according to the present invention connects the terminal end in the conveyance direction of the preceding fiber bundle to the starting end in the conveyance direction of the following fiber bundle. This allows continuous feeding of fiber bundles to the production system, and thus allows efficient production of cleaning members without stopping production of the cleaning members.

Preferably, the system in the aspect 8 further comprises a device for opening the fiber bundles having the connecting part (an aspect 9). According to the aspect 9, since the fiber bundles are opened after forming the connecting part in the fiber bundles, the connecting part of the fiber bundles is securely connected and thus the fiber bundles in the part are not opened, while the parts other than the connecting part are opened and thus the width of the parts is increased to a width that corresponds to the required dimension as the cleaning member.

Preferably, the system in the aspect 9 further comprises a device that comprises a detecting unit that detects the connecting part before laminating the opened fiber bundles and a belt-shaped nonwoven fabric (an aspect 10). According to the aspect 10, the connecting part of the fiber bundles can be detect by the detecting unit by, for example, determining the width, thickness, hardness, etc., of the connecting part.

More preferably, the detecting unit in the aspect 10 detects the connecting part by detecting that the length in the lateral direction of the fiber bundle is smaller than a predetermined length (an aspect 11). According to the aspect 11, the connecting part of the fiber bundles is securely connected and thus is not opened as described above, and then the width of the fiber bundles in the connecting part are not substantially widened. As a result, the detecting unit that determines the width of the fiber bundles can detect that the connecting part of the fiber bundles, the part not having a width that corresponds to the required dimension of the cleaning member, passes under the detecting unit. Preferably, the detecting unit is disposed before the step of laminating the fiber bundles and a belt-shaped nonwoven fabric to form a multi-layer web as described below. Examples of the detecting unit include, for example, phototubes and cameras. As used herein, the phototubes are a detector in which a light-emitting part and a light-receiving part are integrated, the detector comprising the light-emitting part that emits light rays such as infrared rays to a predetermined lateral position of the fiber bundles and the light-receiving part detecting the reflected light. By such configuration, depending upon whether the light-receiving part detects the reflection of light rays from the light-emitting part, the position of the connecting part of the fiber bundles, the part having a smaller width, is detected. The cameras, as used herein, by binarizing an image taken with the cameras using a predetermined parameter and determining whether the fiber bundles are widened to a predetermined lateral position, is for detecting the position of the connecting part of the fiber bundles, the part having a smaller width.

More preferably, the system in any one of the aspects 9-11 further comprises a device for laminating the opened fiber bundles and a belt-shaped nonwoven fabric to form a multi-layer web and a device for melt-bonding the fiber bundles and the belt-shaped nonwoven fabric contained in the multi-layer web to each other (an aspect 12).

More preferably, the system in the aspect 12 further comprises a device for cutting the melt-bonded multi-layer web in the lateral direction of the multi-layer web to form individual cleaning members and a device for ejecting any of the cleaning members that include the connecting part of the fiber bundles (an aspect 13). Since the connecting part of the fiber bundles is securely connected and thus the fiber bundles are not opened, a cleaning member that comprises the connecting part of the fiber bundles is inferior in quality. According to the aspect 13, such low-quality cleaning member can be ejected, and thus higher-quality cleaning members can be produced, which is advantageous.

In the system of producing a cleaning member according to the present invention, two or more of the aspects 8-13 can be combined.

Embodiments of the method and the system of producing a cleaning member according to the present invention are described in more detail with reference to FIGS. 1-8. The method and the system of producing a cleaning member according to the present invention are not limited to the embodiments of the present invention represented by FIGS. 1-8 without departing from the scope and the spirit of the present invention.

First, a cleaning member 1 will be explained with reference to FIG. 1 through FIG. 3.

Figure 1:
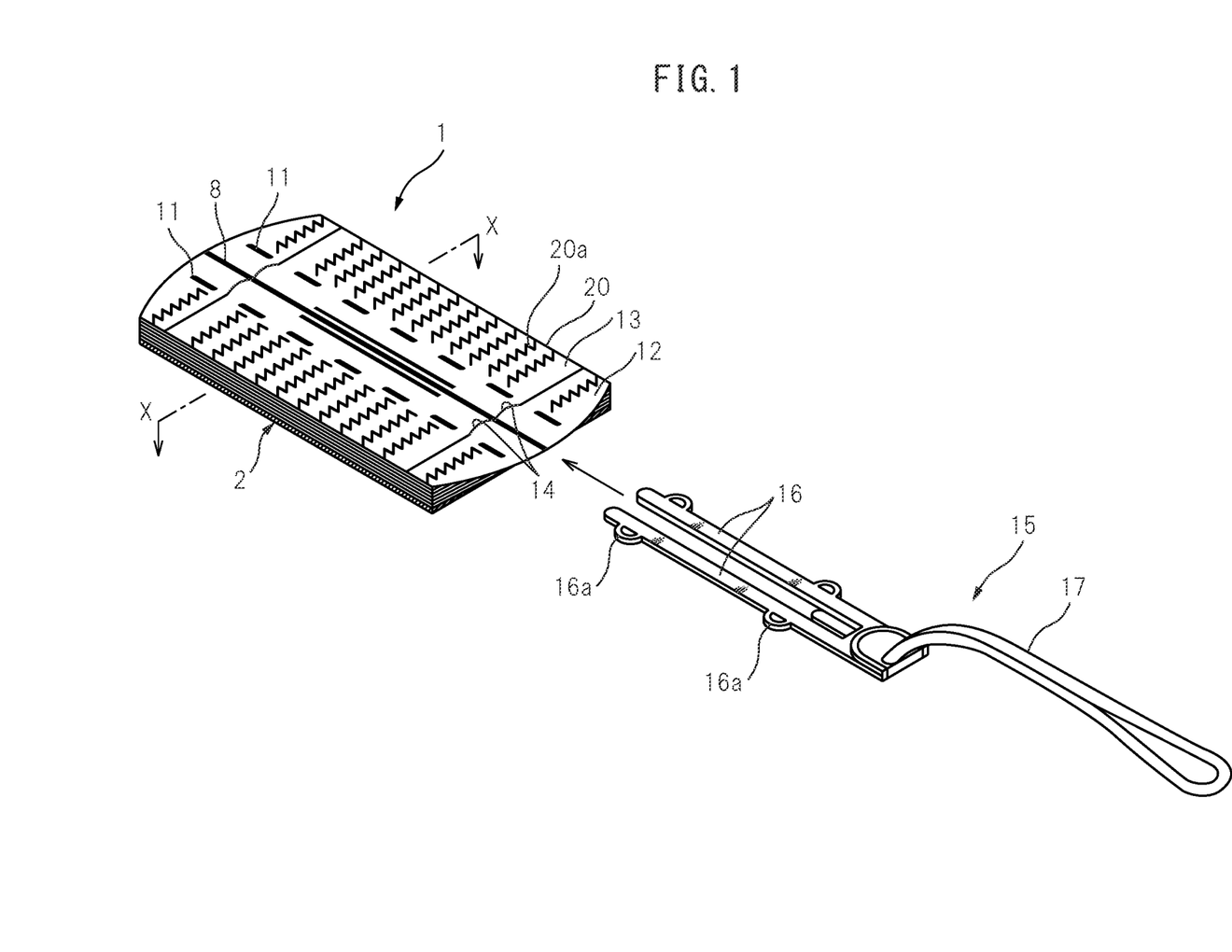
FIG. 1 is a perspective view of a cleaning member produced by an embodiment of the production method and production system of the present invention and a holding tool that is fixed to the cleaning member.
Figure 2:
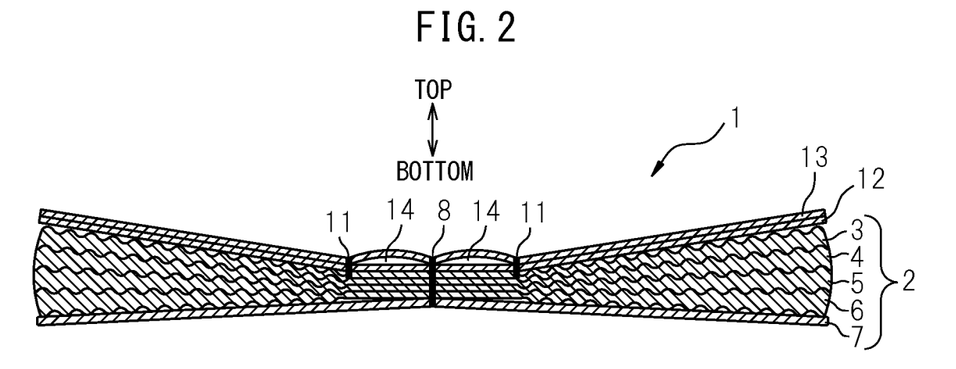
FIG. 2 is a sectional view of FIG. 1 along a X-X line.
Figure 3:
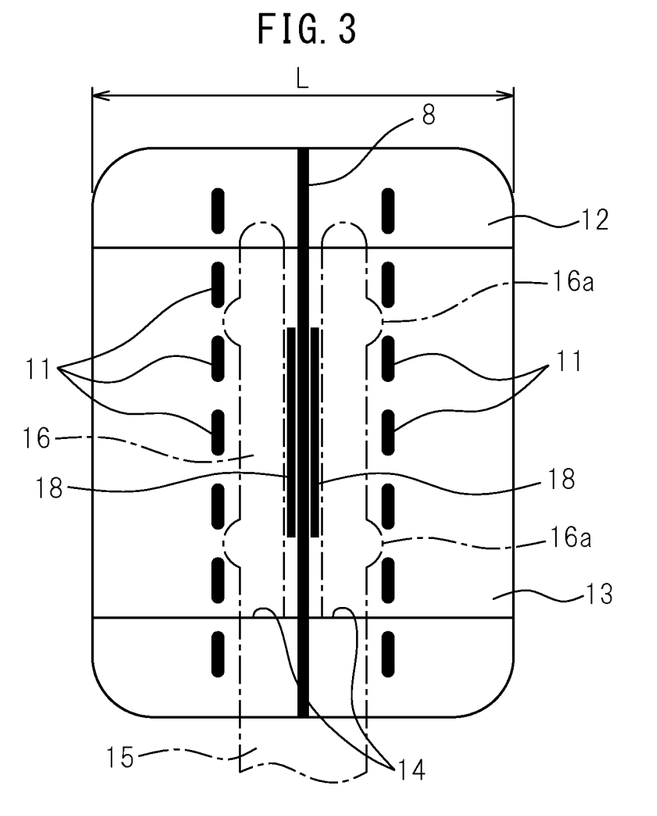
FIG. 3 is a plan view of the cleaning member shown in FIG. 1.

FIG. 1 is a perspective view of a holding tool that is fixed to the cleaning member 1, FIG. 2 is a sectional view of FIG. 1 along the X-X line, and FIG. 3 is a plan view of the cleaning member 1 shown in FIG. 1. In the explanation below, while "top" may be referred to as an upper side and "bottom" as a downside in FIG. 2, "top" and "bottom" in FIG. 2 are only used for the sake of explanation, and do not intend to limit the actual upper or lower direction of the cleaning member 1.

As shown in FIG. 1 through FIG. 3, the cleaning member 1 is equipped with a brush sheet 2, a base sheet 12 stacked on the upper side of the brush sheet 2, and a holding sheet 13 stacked on the upper side of the base sheet 12.

As shown in FIG. 1 through FIG. 3, in the cleaning member 1, a receiving part 14 into which the insertion part 16 of a holding tool 15 is to be inserted has been formed in between the base sheet 12 and the holding sheet 13. As shown in FIG. 1 through FIG. 3, in the cleaning member 1, two receiving parts 14 have been formed so as to receive the insertion part 16 that was divided into two. While the number of the receiving parts 14 in this embodiment is two, the number of the receiving parts can be changed as appropriate depending on the number of divisions of the insertion part 16. In another embodiment, there may be mentioned an embodiment in which the number of the insertion parts 14 is three or more.

As shown in FIG. 2, the brush sheet 2 has a fibrous member of a four-layer structure comprising a first fibrous member 3, a second fibrous member 4 stacked at the downside of the first fibrous member 3, a third fibrous member 5 stacked at the downside of the second fibrous member 4, and a fourth fibrous member 6 stacked at the downside of the third fibrous member 5, and a sheet with slits 7 stacked at the downside of the four-layer structured fibrous member (at the downside of the fourth fibrous member 6). The fibrous member of the brush sheet 2 according to the present embodiment has a four-layer structure, but the layer structure of the fibrous member can be changed as appropriate. In another embodiment, there may be mentioned an embodiment in which the fibrous member has a one-layer structure, a two-layer structure or a three-layer structure, and in still another embodiment, the fibrous member has a structure of five-layer or more. Also, while the brush sheet 2 in the present embodiment has a sheet with slits 7, the presence or absence of the sheet with slits 7 may be selected as appropriate. In another embodiment, the sheet with slits 7 has been omitted.

The first through fourth fibrous members 3 through 6 are fiber bundles to which an oil solution is attached, and thus is a dust adhering agent (for example, an oil solution comprising liquid paraffin as an active ingredient) having an effect of promoting the adherence of dust, trash, etc.

A fiber bundle is, for example, a tow, preferably an opened tow. As described in JIS L 0204-3:1998, 3.1.24, "tow" means a bundle of an extremely large number of aligned filaments.

A fiber bundle may be a bundle of slit fibers (fibers made by cutting a film into reed-shaped part and then stretching them), split fiber (fibers made by subdividing reed-shaped parts of film into a network structure), etc.

As fiber bundles, there can be mentioned, for example, fiber bundles consisting of or comprising thermoplastic fibers, etc. As raw materials constituting fiber bundles, there can be mentioned, for example, polyethylene, polypropylene, polyethylene terephthalate, nylon, rayon, etc., and the type of fibers constituting fiber bundles include, for example, single fibers, composite fibers (for example, core-in-sheath composite fibers, side-by-side composite fibers), etc. From the viewpoint of thermal bondability, composite fibers may preferably be core-sheath type composite fibers, and more preferably core-sheath type composite fibers in which the melting point of the core is higher than that of the sheath.

As a preferred core-in-sheath composite fiber, there can be mentioned core-sheath type composite fibers in which the core consists of polypropylene or polyethylene terephthalate and the sheath consists of polyethylene, and more preferably core-sheath type composite fibers in which the core consists of polyethylene terephthalate and the sheath consists of polyethylene.

The purity of a fiber constituting fiber bundles may preferably be 1-500 dtex, more preferably 2-10 dtex. Fiber bundles may comprise a plurality of fibers having the same purity, or a single fiber or a plurality of fibers having a different purity.

In the present embodiment, each fiber constituting fiber bundles is composed of curled fibers. By allowing each fiber to be composed of curled fibers, fiber bundles can be made bulky and can be made a structure that permits easy trapping of dust etc. at the curled parts. In another embodiment, there can be mentioned an embodiment in which each fiber constituting fiber bundles is composed of noncurled fibers.

Similarly to the base sheet 12 and the holding sheet 13, as described below, the sheet with slits 7 is composed of a nonwoven fabric consisting of a thermoplastic fiber (a thermally fusion-bondable fiber) or a nonwoven fabric comprising a thermoplastic fiber, and is formed in a rectangular shape of the same width and the same length as those of the base sheet 12. In the sheet with slits 7, saw-edged cuts (not shown) are made at a given distance along the entire sheet with slits 7, and with the cuts, saw-edged reed-shaped parts (not shown) are formed over the entire length along both lateral ends of the sheet with slits 7.

As shown in FIG. 1 through FIG. 3, a base sheet 12 and a holding sheet 13 are stacked sequentially on the upper side of the first fibrous member 3 of the brush sheet 2, and a receiving part 14 into which the insertion part 16 of the holding tool 15 is to be inserted is formed in between the base sheet 12 and the holding sheet 13.

As shown in FIG. 3, the base sheet 12 and the holding sheet 13 have a rectangular form, and the lateral dimension (the direction of left to right in FIG. 3) of both sheets is set to be the same, and the longitudinal dimension (the vertical direction in FIG. 3) is set to be longer in the base sheet 12 so that both longitudinal ends of the base sheet 12 protrudes by a predetermined length from both longitudinal ends of the holding sheet 13, with the holding sheet 13 being stacked on the upper side of the base sheet 12.

The base sheet 12 and the holding sheet 13 are made of a nonwoven fabric consisting of a thermoplastic fiber (thermally fusion-bondable fiber) or a nonwoven fabric comprising a thermoplastic fiber. As thermoplastic fibers, for example, a polyethylene fiber, a polypropylene fiber, a polyethylene terephthalate fiber, a composite fiber of polyethylene and polyethylene terephthalate, and a composite fiber of polyethylene and polypropylene, such as core-sheath type composite fibers in which the core is composed of polyethylene terephthalate and the sheath is composed of polyethylene can be mentioned. As the type of nonwoven fabric, for example, a thermal bond nonwoven fabric, a spunbonded nonwoven fabric, a spunlace nonwoven fabric and the like can be mentioned.

In another embodiment, there can be mentioned an embodiment in which the base sheet and the holding sheet are made of a thermoplastic resin film such as a polyethylene film and a polypropylene film, and in still another embodiment, the base sheet and the holding sheet are made of a laminate sheet comprising a nonwoven fabric and a resin film.

The base sheet 12 and the holding sheet 13 are integrally fusion-bonded to all the layers (the first fibrous member 3, the second fibrous member 4, the third fibrous member 5, the fourth fibrous member 6, and the sheet with slits 7) of the brush sheet 2 through a first melt bonded part forming device 158 described below, and in the cleaning member 1, a first melt-bonding part 8 longitudinally extending in the central part is formed as shown in FIG. 1 through FIG. 3. Furthermore, at both ends (lateral ends in FIG. 2) of the first melt-bonding part 8, the base sheet 12 and the holding sheet 13 are integrally bonded to one layer (the first fibrous member 3) of the brush sheet 2 through a second melt bonded part forming device 134 described below, and in the cleaning member 1, two second melt-bonding parts 11 that melt-bond the first fibrous member 3, the base sheet 12, and the holding sheet 13 together are longitudinally formed. Each of the two second melt-bonding parts 11 is intermittently formed. Since the first fibrous member 3 is fusion-bonded to the base sheet 12 and the holding sheet 13 so that the first fibrous member 3 is more likely to follow the movement of these sheets 12 and 13 compared with the other fibrous members 4, 5 and 6, the brush sheet 2 tends to further expand during use, resulting in an improved cleaning efficiency.

The base sheet 12 and the holding sheet 13 are fusion-bonded to all the layers (the first fibrous member 3, the second fibrous member 4, the third fibrous member 5, the fourth fibrous member 6, and the sheet with slits 7) of the brush sheet 2 in the first melt-bonding part 8, and are fusion-bonded to the first fibrous member 3 of the brush sheet 2 in two second melt-bonding parts 11. This results in the formation of a pair of receiving parts 14, which extends in the longitudinal direction of the base sheet 12 and the holding sheet 13 and which is a saclike space opening on both longitudinal ends, compartmentalized by the first melt-bonding part 8 and two second melt-bonding parts 11, thereby enabling the insertion part 16 of the holding tool 15 to be inserted into the receiving part 14.

The base sheet 12 and the holding sheet 13 are fusion-bonded to the first fibrous member 3 of the brush sheet 2 at the central part thereof through a second melt bonded part forming device 134 described below, and in the cleaning member 1, a pair of melt-bonding lines 18 are formed at a predetermined distance in the lateral direction of the base sheet 12 and the holding sheet 13, as shown in FIG. 3, with a first melt-bonding part 8 being formed in between the pair of melt-bonding lines 18. The pair of melt-bonding lines 18 are a landmark for monitoring the position of the first melt-bonding part 8 during the production step, and by monitoring whether the first melt-bonding part 8 is disposed in between the pair of the thermal melt-bonding lines 18 with a sensor etc., good items and defective items can be sorted out.

As shown in FIG. 1 through FIG. 3, two second melt-bonding parts 11 are intermittently provided at several places in the longitudinal direction of the base sheet 12 and the holding sheet 13, and by engaging an arc-like protrusion 16a at each insertion part 16 of the holding tool 15 with the non-fusion-bonded part of the two second melt-bonding parts 11, each insertion part 16 of the holding tool 15 is prevented from coming off each receiving part 14.

As shown in FIG. 1, saw-edged slits 20a are provided at each given distance along the longitudinal direction in both lateral ends (the external parts of two second melt-bonding parts 11) of the base sheet 12 and the holding sheet 13, and with the slits 20a, a plurality of reed-shaped parts 20, both ends of which are saw-edged, are provided. In another embodiment, there can be mentioned an embodiment in which no saw-edged slits 20a are provided in the base sheet 12 and the holding sheet 13, and thus reed-shaped parts 20 are not provided.

As shown in FIG. 1, the holding tool 15 has a pair of rectangular plate-shaped insertion parts 16 disposed in parallel to each other, a pair of arc-like protrusions 16a in each of the insertion parts 16, the protrusions being longitudinally separated from each other and protruding from the outer face of both longitudinal ends of each insertion part 16, and a holder part 17 provided integrally on one end of the insertion part 16, and is made, for example, of plastic etc.

By inserting both insertion parts 16 of the holding tool 15 into both insertion parts 14 of the cleaning member 1, and engaging the protrusions 16a with two second melt-bonding parts 11, the cleaning member 1 can be mounted to the holding tool 15. By holding the holder part 17 of the holding tool 15, and allowing the brush sheet 2 to come into contact with a target cleaning site to move it in the desired direction, dust, etc., at the target cleaning site are trapped by the brush sheet 2, resulting in the cleaning of the target cleaning site.

The cleaning member shown in FIG. 1 through FIG. 3 is an example of a cleaning member that can be produced by the method and system of producing a cleaning member according to the present invention. The method of producing a cleaning member and the system of producing a cleaning member according to the present invention can be used in producing cleaning members as described in, for example, Japanese Unexamined Patent Publication Nos. 2000-296083, 2003-265390, 2003-268663, 2004-223692, 2005-046645, 2005-095665, 2005-111284, 2005-137929, 2005-137930, 2005-137931, 2005-144198, 2005-169148, 2005-199077, 2005-230573, 2005-237975, 2006-015164, 2006-034990, 2006-141483, 2007-135774, 2007-209460 and 2007-209461, 2007-029136, 2007-111297, 2007-135666, 2007-136156, 2007-159612, 2007-236690, 2008-006260, 2008-119171, and 2007-029135, the entire disclosures of which are incorporated herein by reference. The method of producing a cleaning member and the system of producing a cleaning member according to the present invention can be used to produce a cleaning member as described in, for example, U.S. Pat. No. 6,554,937B, US2002/148061A, US2003/0000934A, US2004/0149095A, US2005/0005381A, US2005/039285A, US2005/097695A, US2005/097696A, US2005/132521A, US2005/177967A, US2005/188490A, US2005/193513A, US2005/193514A, US2005/198760A, US2006/016035A, US2006/016036A, US2006/101601A, US2009/165230A and US2009/172904A, as well as US2009/049633A, US2009/255078A and US2010/154156A, the entire disclosures of which are incorporated herein by reference.

Next, an embodiment of a method and a device for producing a cleaning member 1 will be explained with reference to FIG. 4.

Figure 4:
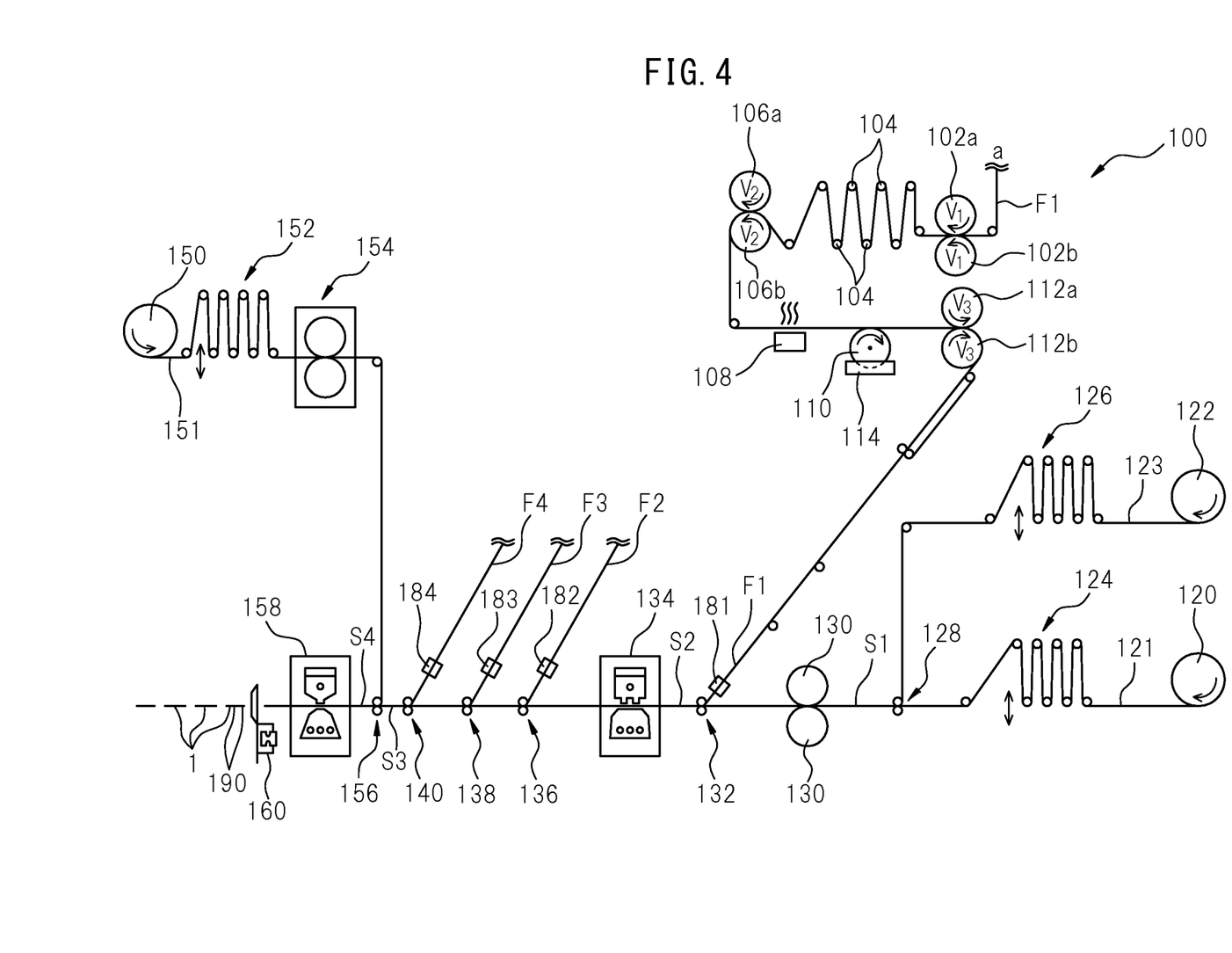
FIG. 4 is a schematic view for explaining a method and a system of producing the cleaning member shown in FIG. 1.

FIG. 4 is a schematic view for explaining a method and the device for producing a cleaning member 1, and in the present embodiment, the method of producing the cleaning member 1 is carried out using a device 100 shown in FIG. 4 to produce the cleaning member 1.

In the present embodiment, the method of producing the cleaning member 1 comprises the following step 1 and step 2.

[Step 1] A step of opening fiber bundles, conveying the bundles, and detecting a connecting part of the bundles.

[Step 2] A step of producing a multi-layer web using the fiber bundles, dividing (cutting) the multi-layer web into the cleaning members 1, and ejecting any of the cleaning members 1 that comprise the connecting part of the fiber bundles.

<Step 1>

Hereinbelow, step 1 will be explained.

In the present embodiment, step 1 comprises the following step 1a and step 1b.

[Step 1a] A step of opening first to fourth fiber bundles F1-F4.

[Step 1b] A step of conveying the first to fourth fiber bundles F1-F4 and detecting a connecting part b (FIG. 5) of the fiber bundles F1-F4.

According to the present embodiment, while step 1 comprises step 1a, the presence or absence of step 1a can be selected as appropriate depending on the type etc. of the fiber bundle used. In another embodiment, an embodiment in which step 1a is omitted can be mentioned. For example, when fiber bundles are composed of a noncurled fiber, step 1a can be omitted.

[Step 1a]

Hereinbelow, the step 1a will be explained with reference to a step of opening the first fiber bundle F1 by way of example, and steps of opening the other fiber bundles F2-F4 can be carried out in a similar manner.

The first fiber bundle F1 composed of a curled fiber is continuously extracted from housing containers 201 and 202 (FIG. 5), and conveyed to first nip rolls 102a and 102b revolving at a constant peripheral velocity V1. The first fiber bundle F1 that passed through the first nip rolls 102a and 102b passes through a plurality of tension rolls 104, and is conveyed to second nip rolls 106a and 106b revolving at a peripheral velocity V2.

The peripheral velocity V2 of the second nip rolls 106a and 106b is faster than the peripheral velocity V1 of the first nip rolls 102a and 102b. Due to the difference in the peripheral velocities, tension is imparted to the first fiber bundle F1 between the first nip rolls 102a and 102b and the second nip rolls 106a and 106b, resulting in the opening of the first fiber bundle F1.

Each tension roll 104 is formed, for example, of a solid steel, and the weight has been adjusted to require a significant degree of force for revolving. Thus, during the movement of the first fiber bundle F1, while rotating each tension roll 104, from the first nip rolls 102a and 102b toward the second nip rolls 106a and 106b, the moving speed of the first fiber bundle F1 has been adjusted not to increase abruptly.

In order to attain the gradual opening of the first fiber bundle F1, each tension roll 104 has been disposed so as to lengthen the distance between the first nip rolls 102a and 102b and the second nip rolls 106a and 106b.

The first fiber bundle F1 that passed through the second nip rolls 106a and 106b passes through an air supplier 108 and is conveyed to third nip rolls 112a and 112b. The peripheral velocity V3 of the third nip rolls 112a and 112b is slower than the peripheral velocity V2 of the second nip rolls 106a and 106b. Due to the difference in the peripheral velocities, the first fiber bundle F1 is relieved, between the second nip rolls 106a and 106b and the third nip rolls 112a and 112b, from the tension applied between the first nip rolls 102a and 102b and the second nip rolls 106a and 106b, resulting in the further opening of the first fiber bundle F1 as well as the widening of the width of the first fiber bundle F1.

On the first fiber bundle F1 that is conveyed from the second nip rolls 106a and 106b to the third nip rolls 112a and 112b, air is blown from the air supplier 108, resulting in the further opening of the first fiber bundle F1.

According to the present embodiment, while the first fiber bundle F1 is opened using the application and release of tension and air blowing, the method of opening can be changed as appropriate. In another embodiment, there can be mentioned an embodiment in which either of the application and release of tension or air blowing is used, and in still another embodiment, there can be mentioned an embodiment in which another method of opening is used in addition to the application and release of tension and air blowing. Also in the present embodiment, while the first through third nip rolls are used in the application and release of tension, the number of nip rolls can be changed as appropriate. In another embodiment, there can be mentioned an embodiment in which additional nip rolls are used for the application and release of tension in addition to the first through third nip rolls.

An oil applicator 110 is further provided between the second nip rolls 106a and 106b and the third nip rolls 112a and 112b. The oil applicator 110 applies, to the fiber bundle F1, an oil solution contained in an oil solution tank 114, the solution having an effect of promoting the adsorption of dust, etc.

[Step 1b]

Hereinbelow, the step 1b will be explained with reference to a step of conveying the first fiber bundle F1 and a step of detecting the connecting part b thereof by way of example, and a step of conveying the other fiber bundles F2-F4 and a step of detecting the connecting part b thereof can be carried out in a similar manner.

After passing through the third nip rolls 112a and 112b, the first fiber bundle F1 passes under a first phototube 181 and proceeds to a merging part 132. Similarly to the first fiber bundle F1, the second, third, and fourth fiber bundles F2, F3 and F4, after passing through the third nip rolls (not illustrated), respectively pass under second, third and fourth phototubes 182, 183, and 184 and respectively proceeds to merging parts 136, 138 and 140. In the step 1b, the phototubes 181-184 can respectively detect the passage of the connecting part b (FIG. 5) of the fiber bundles F1-F4 under the phototubes 181-184. A mechanism for detecting the connecting part b of the fiber bundles F1-F4 will be described in detail later.

<Step 2>

Hereinbelow, step 2 will be explained.

In the present embodiment, step 2 comprises the following step 2a through step 2c.

[Step 2a] A step of laminating the fiber bundles F1-F4 that underwent through the step 1b and another member (a belt-shaped nonwoven fabric in the present embodiment) to form a multi-layer web.

[Step 2b] A step of fixing the fiber bundles F1-F4 and the another member contained in the multi-layer web.

[Step 2c] A step of dividing the multi-layer web into individual cleaning members 1 and ejecting any of the cleaning members 1 that comprise the connecting part b (FIG. 5) of the fiber bundles F1-F4.

[Step 2a]

Hereinbelow, step 2a will be explained.

In the present embodiment, the other members that are stacked with the fiber bundles that underwent the step 1b are belt-shaped nonwoven fabrics 121, 123 and 151. In another embodiment, one or two of these belt-shaped nonwoven fabrics are stacked with the fiber bundles that underwent the step 1b, and in still another embodiment, another belt-shaped nonwoven fabric, in addition to these belt-shaped nonwoven fabrics, is stacked with the fiber bundles that underwent the step 1b. In any of the embodiments, the order of stacking is not limited, but preferably stacking may be carried out so that the belt-shaped nonwoven fabric is positioned at the outermost layer.

The belt-shaped nonwoven fabrics 121 and 123 correspond to the base sheet 12 and the holding sheet 13, respectively, of the cleaning member 1. The belt-shaped nonwoven fabric 121 is continuously curled out from an nonwoven fabric roll 120, and is conveyed intermittently by passing through a dancer roll 124 comprising a plurality of rolls provided in two vertical stages wherein a roll located at the lower stage fluctuates vertically. Similarly, the belt-shaped nonwoven fabric 123 is continuously curled out from an nonwoven fabric roll 122, and is conveyed intermittently by passing through a dancer roll 126 comprising a plurality of rolls provided in two vertical stages wherein a roll located at the lower stage fluctuates vertically. As used herein "is conveyed intermittently" means that the belt-shaped nonwoven fabrics 121 and 123 are conveyed by repeating the steps of proceeding by a given distance (for example, roughly the lateral length of the cleaning member 1) and then stopping conveying for a certain period of time. Thus, by the intermittent conveyance of the belt-shaped nonwoven fabrics 121 and 123, the time required to fusion-bond the constituent elements of the multi-layer web described below can be secured.

The belt-shaped nonwoven fabrics 121 and 123 form a multi-layer web S1 at a merging part 128, and the multi-layer web S1 passes through a gather cutter 130 in which saw-edged blades (not shown) are intermittently formed on the surface thereof in a circumferential direction. This results in the formation of cuts corresponding to cuts 20a (see FIG. 1) in the base sheet 12 and the holding sheet 13. And the multi-layer web S1 proceeds to a merging part 132.

At the merging part 132, the multi-layer web S1 merges with the first fiber bundle F1 that underwent the step 1, and the first fiber bundle F1 is stacked on the multi-layer web S1 to form a multi-layer web S2. The first fiber bundle F1 is configured to become loosened slightly in between the third nip rolls 112a and 112b and the merging part 132, and thus fulfills the same function as a dancer roll provided between them would do.

At merging parts 136, 138 and 140, the multi-layer web S2 merges sequentially with the second fiber bundle F2 through the fourth fiber bundle F4 that underwent the step 1, and the second fiber bundle F2 through the fourth fiber bundle F4 are stacked sequentially on the multi-layer web S2 to form a multi-layer web S3.

A belt-shaped nonwoven fabric 151 corresponds to the sheet with slits 7 of the cleaning member 1. The belt-shaped nonwoven fabric 151 is continuously curled out from the nonwoven fabric roll 150, and is intermittently conveyed by passing through a dancer roll 152, and then passes through a gather roll 154. The gather roll 154 has saw-edged blades (not shown) continuously formed on the surface of the roll in a circumferential direction, which results in the formation of saw-edged cuts (not shown) on the belt-shaped nonwoven fabric 151 that passed through the gather roll 154.

The belt-shaped nonwoven fabric 151 merges with the multi-layer web S3 at a merging part 156, and the belt-shaped nonwoven fabric 151 is stacked on the multi-layer web S3 to form a multi-layer web S4.

[Step 2b]

Hereinbelow, step 2b will be explained.

Before merging with the second fiber bundle F2 through the fourth fiber bundle F4, the multi-layer web S2 passes through a second melt bonded part forming device 134. The second melt bonded part forming device 134 fusion-bonds belt-shaped nonwoven fabrics 121 and 123 contained in the multi-layer web S2 to the first fiber bundle F1 to form two second melt-bonding parts 11 (see FIG. 3). This results in the melt-bonding of the multi-layer web S2 in the direction of the thickness thereof. In the present embodiment, while a heat sealing device is used as the second melt bonded part forming device 134, another heat sealing device (such as an ultrasonic sealing device) may be used.

The multi-layer web S4 passes through a first melt bonded part forming device 158. The first melt bonded part forming device 158 fusion-bonds the entire hole multi-layer web S4 to form a first melt-bonding part 8 (see FIG. 3) on the multi-layer web S4. This results in the melt-bonding of the multi-layer web S4 in the direction of the thickness thereof. In the present embodiment, while a heat sealing device is used as the first melt bonded part forming device 154, the heat sealing device can be changed as appropriate. In another embodiment, an ultrasonic sealing device is used.

[Step 2c]

Hereinbelow, step 2c will be explained. The multi-layer web S4 that passed through the first melt bonded part forming device 158 is cut in the lateral direction of the multi-layer web S4 by a cutting device 160 to form individual cleaning members 1. The cleaning members 1 including the connecting part b (FIG. 5) of the fiber bundles F1-F4 that are not substantially opened, the part being detected by the four phototubes 181-184 as described above, is ejected by an ejecting device 190. Although not illustrated in detail in the figure, the ejecting device 190 is disposed on a side of a conveyance path for the cleaning members 1 and is a device that ejects the cleaning members 1 at the ejection point from the conveyance path by a command from a control unit (not illustrated) by, for example, pushing the cleaning member 1 out. The control unit comprises a main body such as, for example, a computer and a programmable logic controller (PLC), and the main body has a processor and a memory. The distance from the detection point at which the detecting unit detects the connecting part b of the fiber bundles F1-F4 to the ejection point at which the ejecting device 190 ejects the cleaning members 1 from the conveyance path for the cleaning member 1 is constant. Thus, the number N of the cleaning members 1 obtained by the multi-layer web between the detection point and the ejection point, can be calculated by "(the distance from the detection point to the ejection point)/(the length L of a side of one of the cleaning members 1 (FIG. 3))". When the detecting unit detects that the connecting part b of the fiber bundles F1-F4 passed through the detection point, a detection signal is input into the control unit, which then starts to count the number of the cleaning members 1 passing through the ejection point. When the counted number reaches the number N of the cleaning members 1, i.e., when a cleaning member 1 that includes the connecting part b of the fiber bundles reaches the ejecting part, the ejecting device is started to eject the cleaning member 1 that includes a connecting part b of the fiber bundles F1-F4. Ejection of only the Nth cleaning member 1 counted from the start of the count can prevent the low-quality cleaning members 1 that include the connecting part b of the fiber bundles F1-F4 from being contained into the finished products. Alternatively, in order to more securely eject the connecting part b of the fiber bundles, (N±2)th ((N−2)th, (N−1)th, Nth, (N+1)th, and (N+2)th) cleaning members 1 or (N±1)th ((N−1)th, Nth, and (N+1)th) cleaning members 1 can be ejected. This is because also in a portion near the connecting part b of the fiber bundles, the fiber bundles F1-F4 may be insufficiently opened.

The cleaning member 1 produced according to the present embodiment contains the sheet with slits 7, whereas a cleaning member produced by another embodiment does not contain the sheet with slits 7. In the cleaning member 1 produced by the present embodiment, the receiving part 14 is disposed on the face of the cleaning member 1, whereas in a cleaning member produced by another embodiment, the receiving part 14 is disposed in between any of adjacent fibrous members 3 through 6 by changing the order of stacking the base sheet 12 and the holding sheet 13 and the fibrous members 3 through 6. This makes it possible to use both faces of the cleaning member 1 in cleaning. At this time, in order to facilitate the insertion of the insertion part 16 into the receiving part 14, the longitudinal dimension (vertical dimension in FIG. 3) of the base sheet 12 and the holding sheet 13 may preferably be made longer than that of the fibrous members 3 through 6, and these dimensions can be arbitrarily determined. Also, at this time, the sheet with slits 7 may or may not be used, and the sheet with slits 7 may be disposed on both faces of the cleaning member 1.

Figure 5:
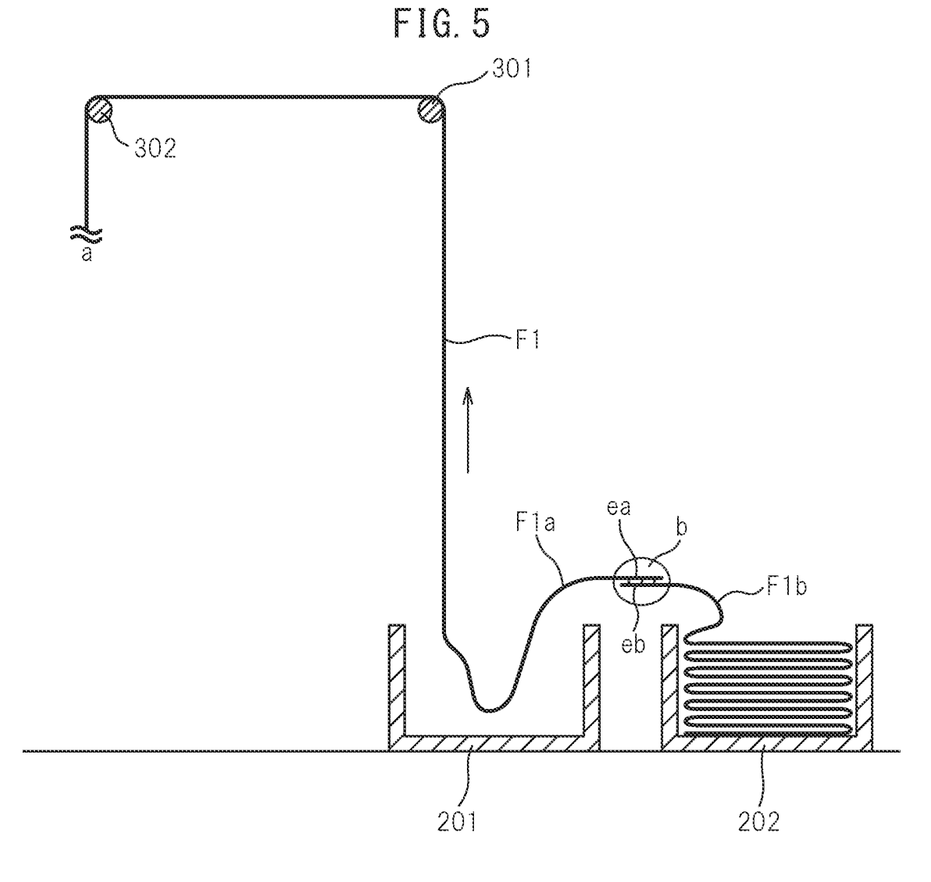
FIG. 5 is a view that illustrates an embodiment of the production method and the production system of the present invention.
Figure 6:
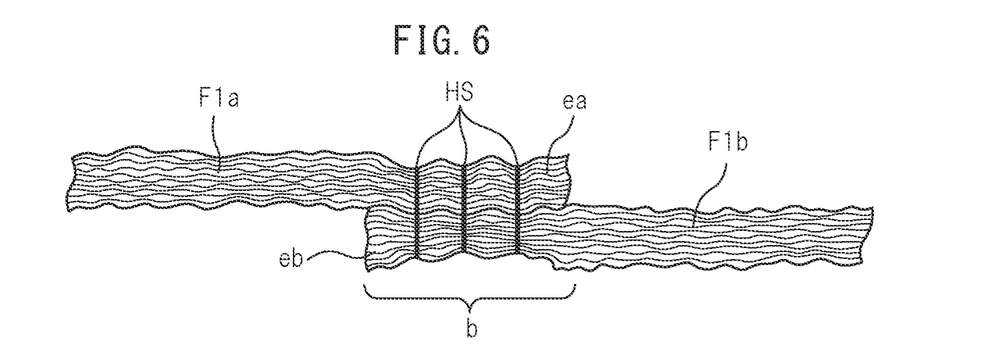
FIG. 6 is a view that schematically illustrates a connecting part of fiber bundles.

FIG. 5 is a drawing that schematically illustrates that a first fiber bundle F1 formed by connecting a preceding first fiber bundle F1a and a following first fiber bundle F1b that are respectively housed in a housing container 201 and a housing container 202 is diverted by non-revolving bars 301 and 302 to feed the first fiber bundle F1 to nip rolls 102a and 102b (FIG. 4). Thus, the portion indicated by the reference symbol "a" in FIG. 5 of the fiber bundle F1 is continued to FIG. 4. It should be noted that the step illustrated in FIG. 5 is a process prior to the step 1a described above with reference to FIG. 4. The terminal end ea of the preceding fiber bundle F1a and the starting end eb of the following fiber bundle F1b is fixed by melt-bonding such as heat sealing or by adhesion such as hot melt to connect the fiber bundles F1a and F1b at the outer surface of the terminal end ea and the starting end eb, thereby realizing continuous production of the cleaning members 1. In this embodiment, the terminal end ea and the starting end eb as described above are manually melt-bonded by using a handheld heat sealing device to form fixing parts HS (FIG. 6). In another embodiment, the terminal end ea and the starting end eb as described above are handled by using a robot arm, etc., and are fixed each other by using a heat sealing device, etc.

FIG. 6 is a schematic view of the connecting part b of two first fiber bundles F1. The connecting part b of the fiber bundles F1 is securely fixed by forming the fixing parts HS, and thus the fiber bundles F1 in the part are not opened. Thus, it is understood that the width of the bundles are not substantially increased even after the opening step (the step 1a as described above).

In this embodiment, as illustrated in FIG. 6, the fiber bundles have three fixing parts HS. However, the fiber bundles may have one or two fixing parts HS as long as the fiber bundles F1 are fixed sufficiently so that the connecting part b of the fiber bundles F1 is not separated by the tension applied to the fiber bundles F1 in the subsequent steps, or the fiber bundles may have four or more fixing parts HS.

Now, a mechanism for detecting the connecting part b of the fiber bundles F1-F4 by a detecting unit, which is pairs of phototubes 181-184 in this embodiment, in the end of the step 1b as described above will be described in more detail. Hereinbelow, as an example of detection of the connecting part b of the fiber bundles F1-F4, the case of the first fiber bundle F1 and the first phototube 181 will be described. It is appreciated that, in the case of the second fiber bundle F2 and the second phototube 182, the case of the third fiber bundle F3 and the third phototube 183 and the case of the fourth fiber bundle F4 and the fourth phototube 184, the connecting part b of the second fiber bundle F2, the connecting part b of third fiber bundle F3 and the connecting part b of the fourth fiber bundle F4 can be respectively detected by the second phototube 182, the third phototube 183 and the fourth phototube 184 in the same mechanism as in the case of the first fiber bundle F1 and the first phototube 181. This allows ejection of low-quality cleaning members 1 that include the connecting part b of the fiber bundles F1-4, the part being not substantially opened.

Figure 7:
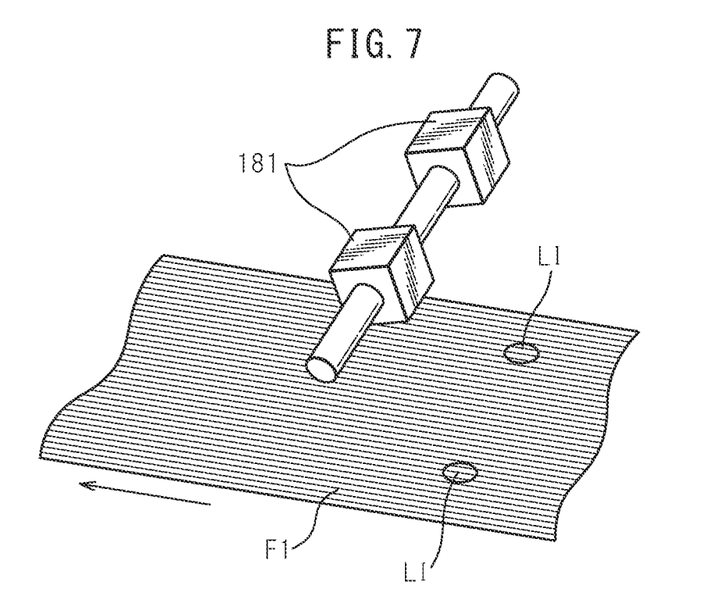
FIG. 7 is a schematic view that explains an embodiment of a step of detecting a connecting part of fiber bundles by a detecting unit and a device that comprises the detecting unit.

FIG. 7 is a view that schematically illustrates that a part of the first fiber bundle F1, the part being not the connecting part b, passes under a pair of phototubes 181 in the step of conveying the first fiber bundle F1. In FIG. 7, light irradiated parts LI, which are a surface part of the fiber bundle F1, the part being to be irradiated with light rays from a light-emitting part of the phototubes 181, are spaced in the lateral direction the fiber bundle F1 at a certain distance. In the case of FIG. 7, the width of the fiber bundle F1 is increased by opening the fiber bundle F1 to match the dimensions of the cleaning members 1, and thus the light rays from the light-emitting part is reflected by the fiber bundle F1. Light-receiving parts of the phototubes 181 can detect both of the reflected lights, thereby determining that the part of the fiber bundle F1 passing under the phototubes 181 is not the connecting part b of the fiber bundle F1.

Figure 8:
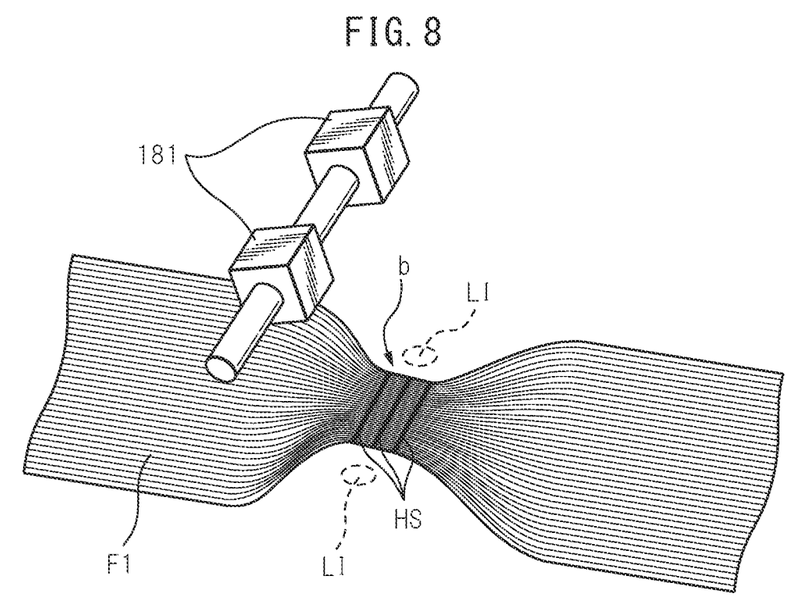
FIG. 8 is a schematic view that explains an embodiment of a step of detecting a connecting part of fiber bundles by a detecting unit and a device that comprises the detecting unit.

FIG. 8 is a view that schematically illustrates that the connecting part b of the first fiber bundle F1 passes under a pair of phototubes 181 in the step of conveying the first fiber bundle F1. In FIG. 8, the connecting part b of the first fiber bundle F1 lies under the phototubes 181. The connecting part b is not substantially opened as described above, and the width of the bundle is not increased. Thus, the fiber bundle F1 is not irradiated with the light rays from the light-emitting part of the phototubes 181, the rays irradiating a surface of the fiber bundle F1 in the condition as illustrated in FIG. 7. Then, the light-receiving part of the phototubes 181 cannot detect that the light rays from the light-emitting part is reflected, thereby determining that the part of the fiber bundle F1 passing under the phototubes 181 is the connecting part b of the fiber bundle F1. In FIG. 8, both of the light-receiving parts of the phototubes 181 does not detect the reflected light, while when either of the light-receiving parts does not detect the reflected light, it can also be determined that the connecting part b of the fiber bundle F1 is passing under the phototube 181. As described above, in order for the phototubes 181 to detect the connecting part b of the fiber bundle F1, the phototubes 181 should be disposed considering the detection accuracy so that the distance between the light irradiated parts LI is larger than the width of the connecting part b of the fiber bundle F1 and is smaller than the wide of the parts of the fiber bundle F1, other than the connecting part b.

In this embodiment, to detect the connecting part b of the fiber bundle F1, the phototubes determine whether the length in the lateral direction of the fiber bundle F1 is smaller than a predetermined length, which is the distance between the light irradiated parts LI. In another embodiment; however, the thickness of the fiber bundle F1 may be determined, or the difference between the hardness of the connecting part b and the hardness of a part other than the connecting part b of the fiber bundle F1 may be determined by, for example, a contact sensor, since the fixing part HS is hard due to the melt-bonding or the adhesion.

The present application claims the benefit of the following patent applications, the entire disclosures of which are incorporated herein by reference:

(1) JP Patent Application No. 2012-289181 filed on Dec. 29, 2012, and US patent application claiming priority thereof,
(2) JP Patent Application No. 2012-289182 filed on Dec. 29, 2012, and US patent application claiming priority thereof,
(3) JP Patent Application No. 2012-289174 filed on Dec. 29, 2012, and US patent application claiming priority thereof,
(4) JP Patent Application No. 2012-289189 filed on Dec. 29, 2012, and US patent application claiming priority thereof,
(5) JP Patent Application No. 2012-289175 filed on Dec. 29, 2012, and US patent application claiming priority thereof,
(6) JP Patent Application No. 2012-289188 filed on Dec. 29, 2012, and US patent application claiming priority thereof,
(7) JP Patent Application No. 2012-289179 filed on Dec. 29, 2012, and US patent application claiming priority thereof,
(8) JP Patent Application No. 2012-289177 filed on Dec. 29, 2012, and US patent application claiming priority thereof,
(9) JP Patent Application No. 2012-289184 filed on Dec. 29, 2012, and US patent application claiming priority thereof,
(10) JP Patent Application No. 2012-289178 filed on Dec. 29, 2012, and US patent application claiming priority thereof,
(11) JP Patent Application No. 2012-289176 filed on Dec. 29, 2012, and US patent application claiming priority thereof,
(12) JP Patent Application No. 2013-002855 filed on Jan. 10, 2013, and US patent application claiming priority thereof, and
(13) JP Patent Application No. 2013-002857 filed on Jan. 10, 2013, and US patent application claiming priority thereof.

REFERENCE SIGNS LIST

1: cleaning member; 2: brush sheet (shaggy brush sheet); 3: first fibrous member; 4: second fibrous member; 5: third fibrous member; 6: fourth fibrous member; 7: sheet with slits; 8: first melt-bonding part; 11: second melt-bonding part; 12: base sheet; 13: holding sheet; 14: receiving part; 15: holding tool; 16: insertion part; 16a: protrusion; 17: holder part; 18: melt-bonding line; 20: reed-shaped part; 20a: slit; 100: cleaning member-producing device; 102a and 102b: first nip rolls; 104: tension roll; 106a and 106b: second nip rolls; 108: air supplier; 110: transcription roll; 112a and 112b: third nip rolls; 113: blade member; 114: oil solution tank; 120, 122 and 150: nonwoven fabric rolls; 121, 123 and 151: belt-shaped nonwoven fabrics; 124, 126 and 152: dancer rolls; 128, 132, 136, 138, 140 and 156: merging parts; 130: gather cutter; 134: second melt bonded part forming device; 154: gather roll; 158: first melt bonded part forming device; 160: cutting device; 181: first phototube (detecting unit); 182: second phototube (detecting unit); 183: third phototube (detecting unit); 184: fourth phototube (detecting unit); 190: ejecting device; 201 and 202: housing containers; 301 and 302: non-revolving bars; F1: first fiber bundle; F2: second fiber bundle; F3: third fiber bundle; F4: fourth fiber bundle; b: connecting part; ea: terminal end; eb: starting end.

The invention claimed is:

1. A method of producing a cleaning member, the method comprising:
connecting, prior to opening, at least two tows that are elongated in a conveyance direction, by connecting a terminal end of a preceding tow in the conveyance direction and a starting end of a following tow in the conveyance direction to form a connecting part of the tows,
after said connecting, opening, without cutting, the at least two connected tows by application of tension and relaxation on the at least two connected tows in the conveyance direction,
after said opening, laminating the at least two connected tows and a belt-shaped nonwoven fabric to form a multi-layer web, and fixing the at least two connected tows to the belt-shaped nonwoven fabric in the multi-layer web, and
after said fixing, cutting the multi-layer web in a lateral direction of the multi-layer web to form individual cleaning members, and ejecting any of the cleaning members that include the connecting part of the tows.

2. The method according to claim 1, further comprising detecting the connecting part by a detecting unit after said opening the tows and before said laminating the tows and the belt-shaped nonwoven fabric.

3. The method according to claim 2, wherein the detecting unit detects the connecting part by determining that a length of the tows in the lateral direction is less than a predetermined length.

4. The method according to claim 1, wherein said fixing includes melt-bonding the tows and the belt-shaped nonwoven fabric contained in the multi-layer web to each other.

5. The method according to claim 1, wherein in said connecting, each of the at least two tows elongated in the conveyance direction is a bundle of aligned filaments.

6. A system of producing a cleaning member, the system comprising:
   a device for connecting, prior to opening, at least two tows that are elongated in a conveyance direction by connecting a terminal end of a preceding tow in the conveyance direction and a starting end of a following tow in the conveyance direction to form a connecting part of the tows,
   a device for opening, without cutting, the at least two connected tows having the connecting part by application of tension and relaxation on the at least two connected tows in the conveyance direction to form opened, connected tows,
   a device for laminating the opened, connected tows and a belt-shaped nonwoven fabric to form a multi-layer web,
   a device for melt-bonding the tows and the belt-shaped nonwoven fabric in the multi-layer web to each other,
   a device for cutting the melt-bonded multi-layer web in a lateral direction of the multi-layer web to form individual cleaning members, and
   a device for ejecting any of the cleaning members that include the connecting part of the tows.

7. The system according to claim 6, further comprising a detecting unit configured to detect the connecting part, the detecting unit is arranged upstream of the device for laminating the opened tow and the belt-shaped nonwoven fabric in the conveyance direction.

8. The system according to claim 7, wherein the detecting unit is configured to detect the connecting part by determining that a length in the lateral direction of the tows is smaller than a predetermined length.

9. A method of producing a cleaning member, the method comprising:
   conveying at least two tows in a conveyance direction;
   connecting (i) a terminal end of a preceding tow of the two tows in the conveyance direction and (ii) a starting end of a following tow of the two tows in the conveyance direction to form a connecting part of the two tows; and
   after said connecting, opening, without cutting, the two connected tows by application of tension and relaxation on the two connected tows in the conveyance direction.

10. The method according to claim 9, the method further comprising
   laminating the opened tows and a belt-shaped nonwoven fabric, and
   detecting the connecting part by a detecting unit that detects the connecting part after said opening and before said laminating.

11. The method according to claim 10, wherein the detecting unit detects the connecting part by determining that a length of the tows in a lateral direction of the tows is less than a predetermined length.

12. The method according to claim 9, wherein in said connecting, each of the at least two tows elongated in the conveyance direction is a bundle of aligned filaments.

* * * * *

UNITED STATES PATENT AND TRADEMARK OFFICE
CERTIFICATE OF CORRECTION

PATENT NO. : 10,638,908 B2
APPLICATION NO. : 14/758175
DATED : May 5, 2020
INVENTOR(S) : Hiroaki Goto et al.

Page 1 of 1

It is certified that error appears in the above-identified patent and that said Letters Patent is hereby corrected as shown below:

On the Title Page

The Abstract should read as follows:
(57) ABSTRACT
The present invention is a method for manufacturing cleaning members obtained by cutting multi-layer webs formed by: spreading fiber bundles, the lengthwise directions of which are parallel to the direction in which said fiber bundles are conveyed; and layering together at least the spread fiber bundles and non-woven fabric strips. Said method includes a step in which, before spreading, two or more fiber bundles are joined together, forming one or more join sections. Said joins are performed by joining the back end (with respect to the conveyance direction) of one fiber bundle to the front end (with respect to the conveyance direction) of the next fiber bundle.

Signed and Sealed this
Eighth Day of September, 2020

Andrei Iancu
*Director of the United States Patent and Trademark Office*